2,802,039
PRESERVATION OF LATEX
Walter T. L. Ten Broeck, Jr., Serbalawan, Indonesia, assignor, by mesne assignments, to The Goodyear Tire & Rubber Company, a corporation of Ohio No Drawing. Application April 16, 1953, Serial No. 349,298

1 Claim. (Cl. 260—820)

This invention relates to the preservation of natural rubber latex and is particularly concerned with increasing the mechanical stability of latex and stabilizing the KOH value or acidity.

Latex as obtained from the rubber tree is a complex dispersion of low stability consisting of solids dispersed in an aqueous medium in the relationship of about 35% solids to 65% liquid. Generally about 5% of the solids are nonrubber solids, which include mineral salts, resins, sugars and proteins. The protein is generally considered to surround the rubber globules and to undergo putrefaction on standing, thus resulting in coagulation of the rubber. It is therefore necessary to add a preservative, such as ammonia, to latex.

It is also known to preserve latex with formaldehyde, the formaldehyde tending to destroy bacteria and enzymes which increase the acidity of the latex in the course of time. Nevertheless, formaldehyde-preserved latex thickens with age and soon becomes unmanageable. This is probably due to the fact that the use of formaldehyde usually results in a latex acidity of pH 6.5 or lower and therefore causes partial coagulation. Also, formaldehyde-preserved latex displays a serious lack of mechanical stability.

Various attempts have been made to combine the desirable effects of formaldehyde and ammonia in latex, but such attempts have not been satisfactory because formaldehyde and ammonia react to form hexamethylene tetramine which inactivates the formaldehyde and thus inhibits its desired action on enzymes and bacteria which are present in the latex.

While it has been proposed to utilize a weak fixed alkali and formaldehyde to accomplish the desired result because the fixed alkali does not react with the formaldehyde, it has generally been considered undesirable to add strong alkalis to latex in large amounts because the metallic radicals of the alkali cannot subsequently be removed by evaporation as in the case of ammonia. High sodium or potassium content in latex interferes with processing latex, e. g., processing latex into foamed latex sponge.

For example, any excess metal ions in the latex repress the action of the gellants, such as sodium silicofluoride, used in processing, thus requiring an excess amount of gellant for the desired result.

The use of phosphates, such as trisodium phosphate, is undesirable because ammonium phosphate is formed by interaction with preservative ammonia which is added and this acts as a secondary gellant, thus tending to destabilize the latex. Also, phosphates react with metallic ions and water, with which they form acidic metallic phosphates and phosphoric acid which tend to coagulate the latex or to reduce the mechanical stability.

It will thus be seen that present methods of preserving natural rubber latex are unsatisfactory in one way or another and efforts to devise a better method are beset with difficulties.

The present invention overcomes these difficulties and provides a process by which field latex can be preserved for long periods of time with good mechanical stability properties and without the introduction of objectionable amounts of metallic ions.

It is therefore a general object of this invention to provide an improved process for preserving field latex.

It is a further object of this invention to provide a process for treating latex wherein greater and more uniform mechanical stability is attained than heretofore possible.

It is another object of this invention to provide a preserved and concentrated latex which shows no appreciable rise in KOH number (acidity) during storage and/or transportation.

It is a more specific object of this invention to provide an improved process for preserving field latex wherein strong caustic and formaldehyde are added to the latex.

It is a further object of this invention to provide a latex having new and improved characteristics.

In the practice of this invention natural rubber latex is treated preliminarily with formaldehyde and a fixed alkali, the treatment being effected as soon after tapping as possible. The fixed alkali can be any of the alkali metal hydroxides, particularly sodium and potassium hydroxides.

For many purposes, sodium hydroxide is preferred because it is cheaper. For certain purposes, e. g. foam production, potassium hydroxide is preferred, because soluble potassium soaps are used during processing.

Sufficient alkali must be added to maintain the pH of the latex above 7.0 but a large excess of strong alkali must not be added because, as mentioned, it has the undesirable property of introducing metallic ions into the latex where they are available to react or interfere with compounding ingredients later added to the latex. For the same reason, a strong alkali, rather than a weak one, is utilized in the invention since less of it is required to lower the hydrogen ion concentration of the latex.

The quantity of strong alkali added must also be sufficient to precipitate all of the polyvalent ions, e. g. Mg and Ca, which are present in the latex, but must not add unnecessary, undesirable metal ions from the hydroxide.

Field latex contains undesirable polyvalent ions such as divalent ions, e. g. Mg, Ca, etc., which are undesirable because they react with naturally occurring fatty acids and rosin-type constituents in latex to form insoluble soaps and thus prevent these from forming soluble soaps with monovalent radicals. Also, they react with and kill the soluble soaps added in processing latex into sponge rubber and other useful articles. By using monovalent metal hydroxides as taught by this invention, processing is actually improved because the addition later of a fatty acid, e. g. oleic, stearic, palmitic, etc., completes the formation of desirable soluble soaps in situ.

The monovalent metallic ions which are higher in the activity series will replace the undesirable divalent ions, such as Mg and Ca, which are present in the latex in the form of metal salts. The divalent metals will thus form insoluble hydroxides which can be easily removed in the form of a sludge from the latex prior to concentration.

Although the pH can range from about 7.0 to 11.5, the range of pH values should be maintained between 9.5 pH and 10.5 pH in order to provide the desired characteristics. If the caustic used is sodium hydroxide and the latex is the customary 36% latex, about 0.23 to 0.30% NaOH based on the weight of the total latex present will elevate the pH to about 9.5 to 10.5, the range which provides the desired qualities. The amount of strong caustic required will vary roughly in proportion to the water/rubber relationship of the latex. The figures shown above will vary for other strong caustics, e. g., KOH, in proportion to the molecular weights. If desired, a portion of the alkalinity may be provided by ammonia which may be added before or after concentration, but after the formaldehyde has had time to effect sterilization.

In the practice of this invention a preliminary treatment is completed wherein about 0.05 to 0.10% by weight of fixed alkali, based on the weight of the latex, may be used, along with the customary amount of formaldehyde, e. g. about 0.10% to 0.20% based on the weight of latex. This concentration of alkali will give a latex having a pH of approximately 7.5 to 8.5. This low concentration of alkali is not sufficient to precipitate all of the magnesium and calcium in the form of a hydroxide sludge from the latex. It is therefore often necessary to add more alkali in order to effect complete sludge removal. This additional alkali may preferably be in the form of a strong caustic added originally or may be in the form of the customary ammonia treatment provided that the formaldehyde has had sufficient time to accomplish its function of destroying bacteria and enzymes.

The process of the invention, then, is characterized by the use of formaldehyde or the equivalent to destroy bacteria and enzymes causing putrefaction together with sufficient fixed alkali to maintain the alkalinity of the latex high enough to prevent coagulation while the formaldehyde is performing its function, and to effect complete precipitation of the undesirable ions so that they can be removed as a sludge by centrifuging or sedimentation, care being taken to introduce as few metallic radicals as possible, as by use of a strong rather than a weak base, while maintaining the desired alkalinity. Since the amount of fixed alkali added will be kept to a minimum, the latex, after its bacteria and enzyme content has been destroyed, will not be sufficiently basic for shipment and storage.

After the sludge has been removed from the latex, more alkali can be added to maintain the desired alkalinity, e. g. about 0.20 to 0.40% NaOH can be added before or after concentration, said amount being based on the weight of the latex.

The process is further characterized by the addition of ammonia to the latex after the formaldehyde has performed its function, destruction of the formaldehyde then being of no consequence, and after complete sludge removal. In this way, a latex is obtained which is substantially sterile, contains metallic ions in such small concentration as not to interfere with compounding and conversion of the latex into useful articles and is rendered thoroughly stable by the presence of as much ammonia as it is desired to add.

The amount of formaldehyde added should be sufficient to destroy the bacteria and enzymes present, but should not be excessive because of the tendency to destroy ammonia which may be added if desired. For the ordinary 36% field latex, about 0.02 to 1.00% dry formaldehyde based on the weight of latex can be used in the form of a water solution, usually a 37% solution. In the practice of this invention, for customary lattices, it is preferred that the formaldehyde content be from about 0.10% HCHO, which is enough to provide the desired action on enzymes and bacteria, to 0.20% HCHO, which is low enough to be economical, and low enough to be relatively sure that formaldehyde won't be available in sufficient quantities to react with the ammonia which is added later. Because certain antioxidants are formed from enzymatic breakdown, it is better to maintain the amount of formaldehyde on the low side but still maintain enough to destroy sufficient bacteria and enzymes to prevent formation of enough acids to substantially change the alkalinity or KOH number of the latex.

A further advantage of the invention is manifested with respect to latices obtained from plantings of high-yielding rubber clones, variations in latex properties having arisen because specific characteristics are manifested in certain clonal trees. For example, latex properties depend, not only on prompt and effective latex preservation, but also on the inorganic content, e. g. calcium, magnesium, and various phosphates, such content varying from clone to clone. When ammonia is used for latex preservation, the metallic ions, such as those of magnesium and calcium, will be precipitated as metallic ammonium phosphates, e. g., $MgNH_4PO_4$. If there is an insufficient phosphate content in the latex to combine with all the metallic ions, the excess soluble metallic ions may remain in the latex after concentration and thus cause the latex to have poor mechanical stability as well as causing lack of uniformity of product.

This difficulty is avoided when strong alkali, e. g., NaOH or KOH, is used in place of ammonia since the latex will then contain free hydroxyl ions and these throw down a precipitate of insoluble metallic hydroxides and metallic phosphates, thus effecting complete removal of the undesirable ions because a balance between the metal and phosphate content is not required. In this manner complete sludge removal is possible. For this purpose a sodium hydroxide content of 0.20 to 0.30% on the weight of the latex, giving a pH range of 9.5 to 10.5, is preferred.

The effect of variation in the caustic content on the coagulum content found in latex after concentration and the mechanical stability of the treated latex have been tested, the results being set forth in Table I below. In each sample, 3 cc. of 37% formaldehyde solution per kilogram of fresh latex was added in addition to the indicated alkali addition.

TABLE I

| Percent NaOH on Field Latex | Percent Coagulum in Concentrated Latex | Mechanical Stability in Seconds |
|---|---|---|
| 0.00 | coagulated | |
| 0.16 | 0.13 to 0.19 | 120 |
| 0.20 | 0.016 | 330 |
| 0.25 | 0.004 to 0.008 | 825 |

The mechanical stability is the ability of the latex to remain uncoagulated when under severe agitation. The test was conducted according to A. S. T. M. Standard Test Procedure, D-1076-49T found on page 1235 of part 6. In obtaining the tabulated results, a sample of latex was diluted and stirred with a high speed stirrer until coagulation occurred. The time in seconds required for coagulation was taken as the mechanical stability value.

The results above indicate that approximately 0.25% of sodium hydroxide is required in order to obtain highest mechanical stability and the desired very low coagulum content in latex after concentration.

The following table illustrates testing of the invention using NaOH.

TABLE Ia

*Daily pH values of field latex treated with NaOH*

| Sample | Percent NaOH on Latex | Daily pH Values | | | | | | |
|---|---|---|---|---|---|---|---|---|
| | | 0 | 1 | 2 | 3 | 4 | 5 | 6 | 7 |
| A-1 | 0.10 | 7.6 | Coagulated | | | | | | |
| B-1 | 0.15 | 9.05 | do | | | | | | |
| C-1 | 0.20 | 9.6 | 6.7 | discarded | | | | | |
| D-1 | 0.25 | 10.00 | 7.85 | do | | | | | |
| E-1 | 0.30 | 10.55 | 10.32 | 8.5 | 6.95 | discarded | | | |
| F-1 | 0.35 | 11.09 | 10.77 | 10.70 | 10.50 | 9.25 | 7.45 | discarded | |
| G-1 | 0.40 | 11.55 | 11.25 | 11.20 | 11.10 | 11.15 | 10.90 | do | |

The following table further illustrates testing of the invention using both NaOH and HCHO.

TABLE II

*Daily pH values of field latex treated with NaOH/formalin*

| Treatment | | Daily pH Values | | | | | |
|---|---|---|---|---|---|---|---|
| NaOH, Percent | Formalin | 0 | 1 | 2 | 4 | 8 | 30 |
| 0.08 | 3 cc./Kilo | 7.55 | 7.30 | 7.30 | 7.30 | 7.30 | 7.30 |

It is readily apparent that the use of strong caustic resulted in delaying coagulation. However, it is very significant to note from Table II that treatment of the latex with caustic and formaldehyde very markedly increased the stability of the latex while maintaining the caustic content at a relatively low figure.

Similar tests have been conducted using potassium hydroxide instead of sodium hydroxide. These tests show that similar desirable characteristics are imparted to the latex. However, a greater concentration of potassium hydroxide is necessary to insure complete sludge removal with consequent low coagulant content in the cream.

This invention is further characterized by the addition of $NH_3$ to the latex, after desludging, as a means for maintaining the pH of the latex alkaline during storage and shipment. The $NH_3$ can be driven off before the latex is to be used, thus providing a pure latex with a minimum of undesirable ions. If the latex is concentrated by centrifuging, the ammonia required will be added immediately after centrifuging. If the latex is concentrated by creaming, the ammonia may be added before creaming or after creaming. Usually the latex will be preserved by adding about 0.30 to 2.0% ammonia based on the water content. Part or all of the ammonia may be added before or after concentration, but always after sludge removal. The actual amount would thus depend on the water content, latex customarily being concentrated to about 65% solids prior to storage and shipment.

The latex products of this invention have many varied uses such as film coating of various materials, fabrication of dipped articles, cord or fabric impregnation, and the production of foamed rubber. Due to the conditions necessary for proper foam formation this invention is particularly useful and perhaps finds its greatest utility in that field.

While certain representative embodiments and details have been shown for the purpose of illustrating the invention, it will be apparent to those skilled in this art that various changes and modifications may be made therein without departing from the spirit or scope of the invention.

What is claimed is:

In the process of preparing fresh natural rubber latex for storage and shipment, which includes the steps of alkalizing the latex, desludging and concentrating and adding further alkali, the improvement which comprises the step of preliminarily treating fresh nonammoniated latex with from 0.02 to 1.0% by weight of formaldehyde, based on the weight of the latex, in the presence of from 0.1 to 0.4% by weight of an alkali metal hydroxide selected from the group consisting of sodium hydroxide and potassium hydroxide, based on the weight of the latex.

References Cited in the file of this patent

UNITED STATES PATENTS

| 1,619,938 | Jury | Mar. 8, 1927 |
| 1,967,336 | Teague | July 24, 1934 |
| 1,980,599 | Scholz et al. | Nov. 13, 1934 |
| 2,303,430 | Braak | Dec. 1, 1942 |
| 2,327,115 | Linscott | Aug. 17, 1943 |

FOREIGN PATENTS

| 268,219 | Great Britain | Mar. 31, 1927 |
| 450,435 | Great Britain | July 17, 1936 |